(12) United States Patent
Liu et al.

(10) Patent No.: US 11,084,079 B2
(45) Date of Patent: Aug. 10, 2021

(54) WHEEL RIM STRAIGHTENING DEVICE

(71) Applicant: CITIC Dicastal CO., LTD., Hebei (CN)

(72) Inventors: Huiying Liu, Qinhuangdao (CN); Junmeng Li, Qinhuangdao (CN)

(73) Assignee: CITIC DICASTAL CO., LTD, Qinhuangdao (CN)

( * ) Notice: Subject to any disclaimer, the term of this patent is extended or adjusted under 35 U.S.C. 154(b) by 83 days.

(21) Appl. No.: 16/690,728

(22) Filed: Nov. 21, 2019

(65) Prior Publication Data

US 2020/0338612 A1 Oct. 29, 2020

(30) Foreign Application Priority Data

Apr. 29, 2019 (CN) .......................... 201910353263.3

(51) Int. Cl.
*B21D 1/12* (2006.01)
*B21D 1/06* (2006.01)
*B21D 1/08* (2006.01)

(52) U.S. Cl.
CPC ................. *B21D 1/12* (2013.01); *B21D 1/06* (2013.01); *B21D 1/08* (2013.01)

(58) Field of Classification Search
CPC . B21D 53/30; B21D 1/00; B21D 1/06; B21D 1/08; B21D 1/12; B21D 1/14; B21D 3/10; B21D 3/16
USPC .............................................. 33/608; 72/705
See application file for complete search history.

(56) References Cited

U.S. PATENT DOCUMENTS

| | | | | |
|---|---|---|---|---|
| 6,367,303 B1 * | 4/2002 | Hizono | ..................... | B21D 3/14 29/283.5 |
| 9,782,866 B1 * | 10/2017 | Xue | .......................... | B08B 1/04 72/457 |
| 2006/0196244 A1 * | 9/2006 | Neubauer | ................ | B21D 1/08 72/457 |
| 2017/0182543 A1 * | 6/2017 | Xue | ..................... | B21D 53/264 72/457 |
| 2018/0264617 A1 * | 9/2018 | Xue | .......................... | B24B 5/12 72/457 |

FOREIGN PATENT DOCUMENTS

| CN | 107907081 A | * | 4/2018 | .......... | G01B 5/0004 |
|---|---|---|---|---|---|
| CN | 207577171 U | * | 7/2018 | ............... | B21D 5/01 |

* cited by examiner

*Primary Examiner* — Adam J Eiseman
*Assistant Examiner* — Matthew Stephens
(74) *Attorney, Agent, or Firm* — Cooper Legal Group, LLC

(57) ABSTRACT

The disclosure discloses a wheel rim straightening device. The wheel rim straightening device includes a lifting platform; the lifting platform is symmetrically provided with a left horizontal sliding table and a right horizontal sliding table; the left horizontal sliding table and the right horizontal sliding table are each provided with a vertical sliding table; and the two vertical sliding tables are provided with an inner pressure head which extends outwardly and corresponds to an outer pressure head, and a first runout detecting gauge corresponding to a second runout detecting gauge.

11 Claims, 6 Drawing Sheets

WHEEL RIM STRAIGHTENING DEVICE

CROSS-REFERENCE TO RELATED APPLICATIONS

The present application claims benefit of Chinese Patent Application No. 201910353263.3, filed on Apr. 29, 2019, the contents of which are hereby incorporated by reference in their entirety.

BACKGROUND

With the popularity of aluminum alloy wheels, types of wheels become increasing, the wall thickness of rims become thinner, and the performance requirements become higher. In actual production, wheels with runout errors and thin wall deformation exist, and rims of the wheels need to be straightened in order to improve the product quality and pass rate. Based on the situation, the disclosure provides a wheel rim straightening device capable of straightening wheel rims with runout errors and thin wall deformation.

SUMMARY

The disclosure relates to wheel rim straightening, in particular to a wheel rim straightening device.

In view of the situation above, the disclosure aims to provide a wheel rim straightening device capable of straightening wheel rims with runout errors and thin wall deformation, and the wheel rim straightening device can be used for automatic continuous production, and is novel in structure, advanced in technology and high in practicability.

In order to achieve the above objects, the technical solutions of the disclosure are achieved as follows.

A wheel rim straightening device includes a main machine frame and a lifting platform; a left machine frame and a right machine frame are symmetrically arranged on two sides of the main machine frame; a left servo system and a first horizontal sliding table are arranged on the left machine frame; the first horizontal sliding table is provided with a first vertical sliding table; the left servo system is used for controlling the first horizontal sliding table to move left and right and controlling the first vertical sliding table to move up and down relative to the first horizontal sliding table; the right machine frame is provided with a right servo system and a second horizontal sliding table; a second vertical sliding table is arranged on the second horizontal sliding table; the right servo system is used for controlling the second horizontal sliding table to move left and right and controlling the second vertical sliding table to move up and down relative to the second horizontal sliding table; the first vertical sliding table is provided with an outer pressure head which extends inwardly; the second vertical sliding table is provided with an second runout detecting gauge which extends inwardly; the lifting platform is symmetrically provided with left and right inner servo systems and left and right horizontal sliding tables; the left horizontal sliding table and the right horizontal sliding table are each provided with a vertical sliding table; and the two vertical sliding tables are provided with an inner pressure head which extends outwardly and corresponds to the outer pressure head, and a first runout detecting gauge corresponding to the second runout detecting gauge.

Further, the left servo system may include a first horizontal servo motor fixedly connected to the left machine frame, a first horizontal guide rail fixedly connected to the left machine frame, a first vertical servo motor fixedly connected to the first horizontal sliding table, and a first vertical guide rail fixedly connected to the first horizontal sliding table; an output end of the first horizontal servo motor is connected with a third ball screw; the first horizontal servo motor controls the first horizontal sliding table to move left and right under the guiding action of the first horizontal guide rail; the output end of the first vertical servo motor is connected with a fourth ball screw; and the first vertical servo motor controls the first vertical sliding table to move up and down under the guiding action of the first vertical guide rail.

Further, the right servo system may include a second horizontal servo motor fixedly connected to the right machine frame, a second horizontal guide rail fixedly connected to the right machine frame, a second vertical servo motor fixedly connected to the second horizontal sliding table, and a second vertical guide rail fixedly connected to the second horizontal sliding table; an output end of the second horizontal servo motor is connected with a fifth ball screw; the second horizontal servo motor controls the second horizontal sliding table to move left and right under the guiding action of the second horizontal guide rail; an output end of the second vertical servo motor is connected with a sixth ball screw; and the second vertical servo motor controls the second vertical sliding table to move up and down under the guiding action of the second vertical guide rail.

Further, the outer pressure head may be mounted on the first vertical sliding table through a bracket.

Further, the second runout detecting gauge may be mounted on the second vertical slide table through a bracket.

Further, each inner servo system may include a support plate fixedly connected to the lifting platform, a horizontal servo motor fixedly connected to the support plate, and a horizontal guide rail fixedly connected to the support plate; output ends of the horizontal servo motors are connected with first ball screws; the horizontal servo motors control the horizontal sliding tables to move left and right under the guiding action of the horizontal guide rails; vertical servo motors and vertical guide rails are fixedly connected with the horizontal sliding tables; output ends of the vertical servo motors are connected with second ball screws; and the vertical servo motors control the vertical sliding tables to move up and down under the guiding action of the vertical guide rails.

Further, the inner pressure head may be mounted on a corresponding vertical sliding table through a bracket.

Further, the first runout detecting gauge may be mounted on the vertical sliding table on the right side through a bracket.

Further, when wheel rims may be subjected to straightening, the inner pressure head and the outer pressure head are at the same height and are located inside and outside the rims respectively, and the first runout detecting gauge and the second runout detecting gauge are at the same height as the inner pressure head and the outer pressure head.

Compared with the related art, the wheel rim straightening device of the disclosure has the following advantages that The wheel rim straightening device of the disclosure is capable of straightening wheel rims with runout errors and thin wall deformation, can be used for automatic continuous production and is novel in structure, advanced in technology and high in practicability.

BRIEF DESCRIPTION OF THE DRAWINGS

The figures constituting part of the disclosure are used for providing a further understanding of the disclosure, and the illustrative embodiments of the disclosure and explanations thereof are used for explaining the disclosure without undue limitations on the disclosure.

FIG. 1 is a front view of a wheel rim straightening device of the disclosure.

LIST OF REFERENCE SYMBOLS

1—left machine frame, 2—right machine frame, 3—main machine frame, 4—lower air cylinder, 5—lower guide column, 6—lower guide sleeve, 7—lifting platform, 8—support plate, 9—vertical servo motor, 10—horizontal sliding table, 11—horizontal guide rail, 12—first ball screw, 13—vertical guide rail, 14—second ball screw, 15—inner pressure head, 17—horizontal servo motor, 18—vertical sliding table, 19—first bearing seat, 20—first shaft, 21—first bearing, 22—first runout detecting gauge, 23—round bush, 24—first inner air cylinder, 25—inner guide rail, 26—inner sliding block, 27—second inner air cylinder, 28—pull rod, 29—expanding core, 30—flange plate, 31—expanding sleeve, 32—support platform, 33—positioning air cylinder, 34—guide rail, 35—left sliding table, 36—roller way, 37—positioning wheel, 38—rack and pinion, 39—right sliding table, 40—first vertical servo motor, 41—first horizontal servo motor, 42—first coupling, 43—third ball screw, 44—first horizontal guide rail, 45—first horizontal sliding table, 46—first vertical sliding table, 47—fourth ball screw, 48—first vertical guide rail, 49—outer pressure head, 50—second vertical servo motor, 51—second horizontal servo motor, 52—second coupling, 53—fifth ball screw, 54—second horizontal guide rail, 55—second horizontal sliding table, 56—second vertical sliding table, 57—sixth ball screw, 58—second vertical guide rail, 59—second runout detecting gauge, 60—upper air cylinder, 61—upper guide sleeve, 62—upper guide column, 63—moving platform, 64—motor bracket, 65—servo motor, 66—second shaft, 67—rotating table, 68—second bearing, 69—second bearing seat, 70—disc, and 71—cylinder.

DETAILED DESCRIPTION OF THE EMBODIMENTS

It should be noted that the embodiments of the disclosure and the features of the embodiments may be combined with each other without conflict.

The technical solutions of the disclosure will be described clearly and completely hereinafter with reference to the figures and in combination with the embodiments, and obviously, the described embodiments are only a part of the embodiments of the disclosure, not all the embodiments. All other embodiments obtained by those skilled in the art based on the embodiments of the disclosure without creative efforts fall within the protection scope of the disclosure.

Figure 1:
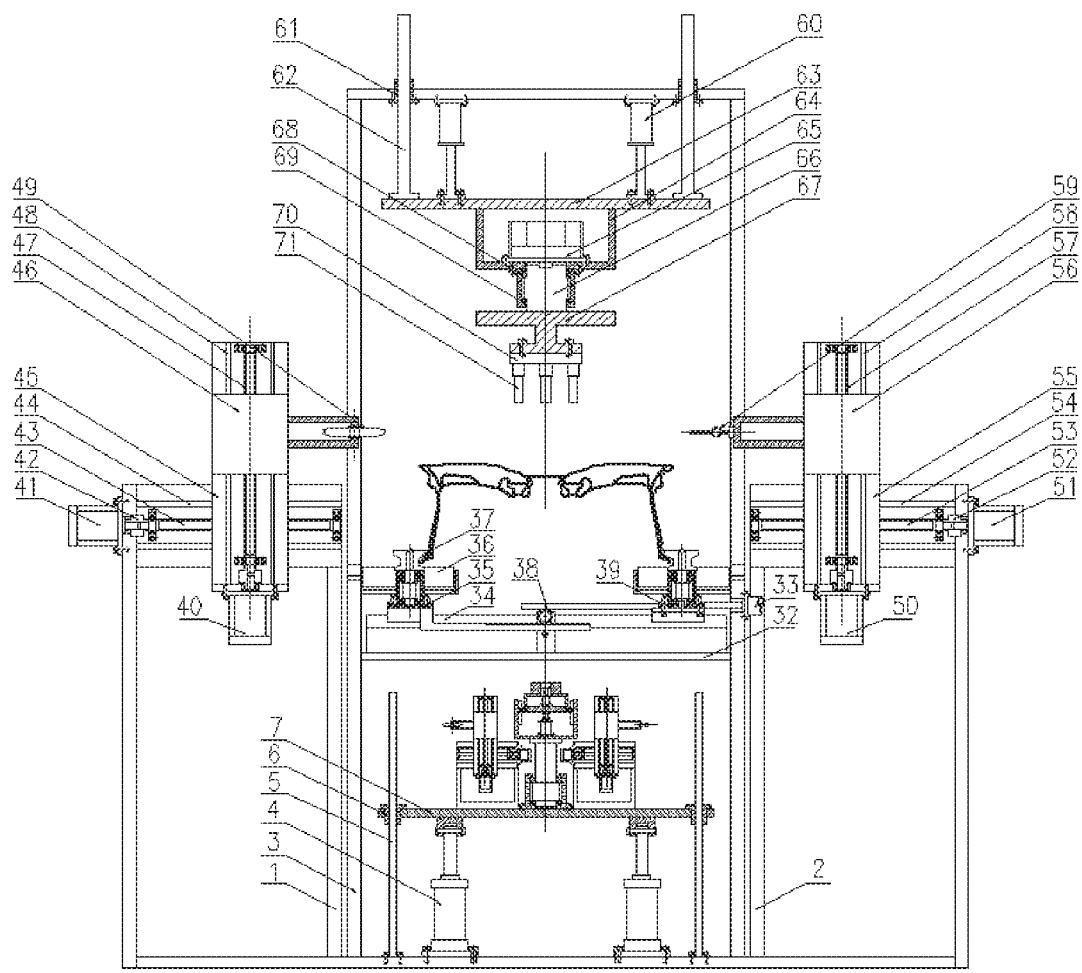
Figure 2:
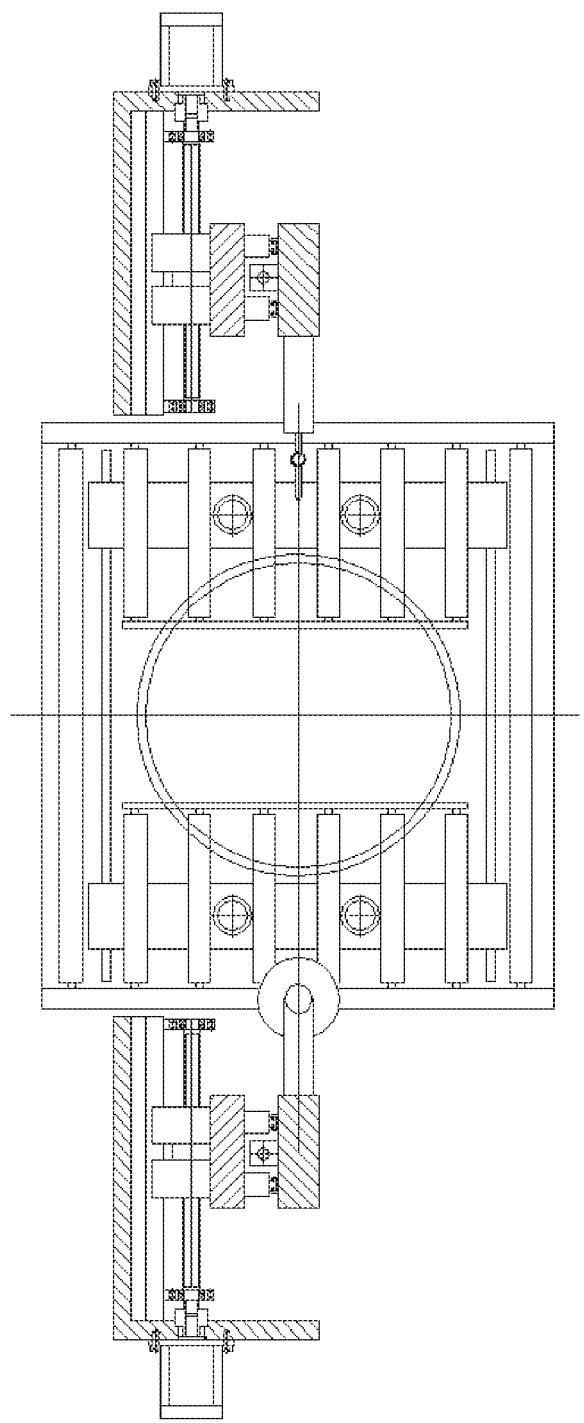
FIG. 2 is a top view of a wheel rim straightening device of the disclosure.
Figure 3:
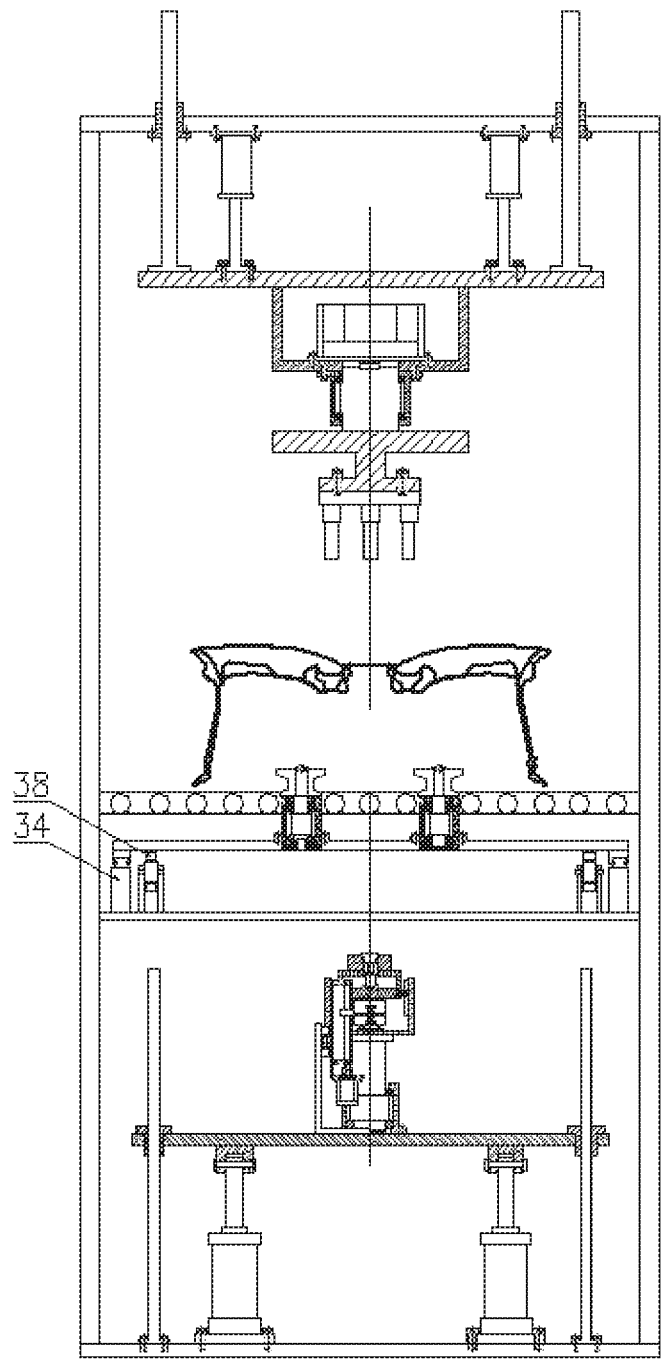
FIG. 3 is a left view of a wheel rim straightening device of the disclosure.
Figure 4:
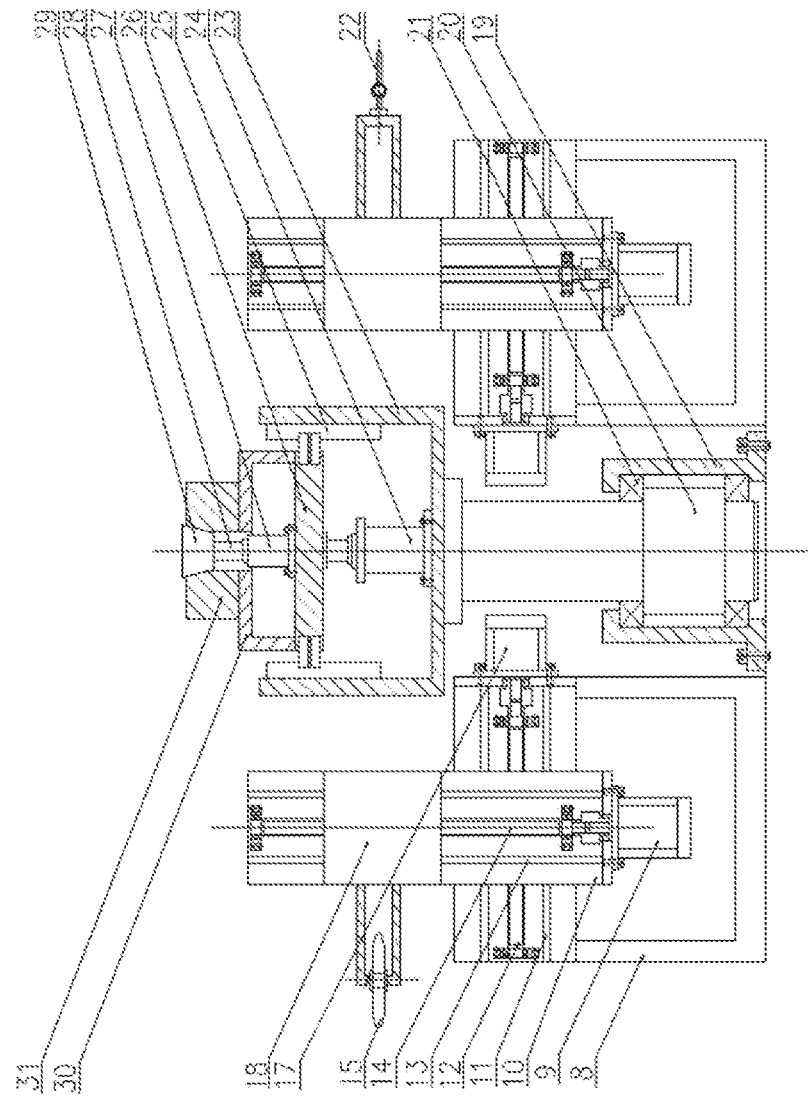
FIG. 4 is an enlarged front view of inner servo systems of a wheel rim straightening device of the disclosure.
Figure 5:
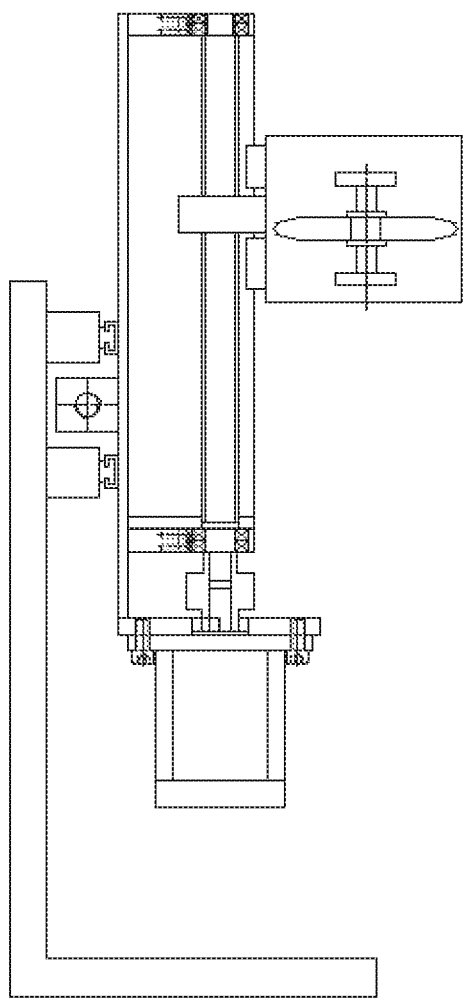
FIG. 5 is an enlarged left view of inner servo systems of a wheel rim straightening device of the disclosure.
Figure 6:
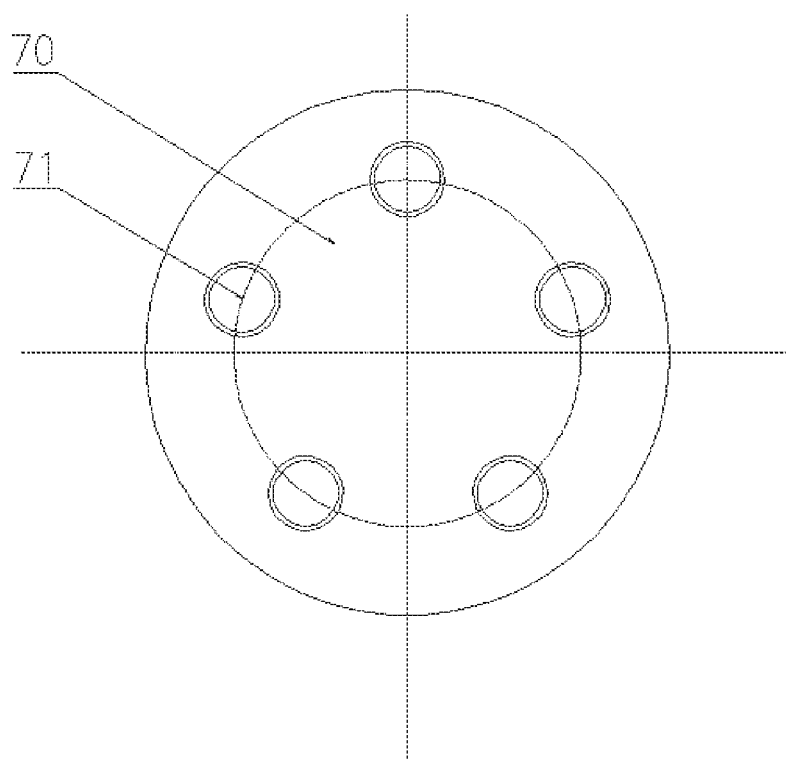
FIG. 6 is an enlarged upward view of a disc and cylinders of a wheel rim straightening device of the disclosure.

A wheel rim straightening device according to embodiments of the disclosure will be described below with reference to FIGS. 1 to 6 and in combination with the embodiments.

As shown in FIGS. 1 to 6, a wheel rim straightening device includes a left machine frame 1, a right machine frame 2, a main machine frame 3, lower air cylinders 4, lower guide columns 5, lower guide sleeves 6, a lifting platform 7, support plates 8, vertical servo motors 9, horizontal sliding tables 10, horizontal guide rails 11, first ball screws 12, vertical guide rails 13, second ball screws 14, an inner pressure head 15, brackets, horizontal servo motors 17, vertical sliding tables 18, a first bearing seat 19, a first shaft 20, a first bearing 21, a first runout detecting gauge 22, a round bush 23, a first inner air cylinder 24, inner guide rails 25, an inner sliding block 26, a second inner air cylinder 27, a pull rod 28, an expanding core 29, a flange plate 30, an expanding sleeve 31, a support table 32, a positioning air cylinder 33, guide rails 34, a left sliding table 35, roller ways 36, positioning wheels 37, rack and pinions 38, a right sliding table 39, a first vertical servo motor 40, a first horizontal servo motor 41, a first coupling 42, a third ball screw 43, a first horizontal guide rail 44, a first horizontal sliding table 45, a first vertical sliding table 46, a fourth ball screw 47, a first vertical guide rail 48, an outer pressure head 49, a second vertical servo motor 50, a second horizontal servo motor 51, a second coupling 52, a fifth ball screw 53, a second horizontal guide rail 54, a second horizontal sliding table 55, a second vertical sliding table 56, a sixth ball screw 57, a second vertical guide rail 58, a second runout detecting gauge 59, upper air cylinders 60, upper guide sleeves 61, upper guide columns 62, a moving platform 63, a motor bracket 64, a servo motor 65, a second shaft 66, a rotating table 67, a second bearing 68, a second bearing seat 69, a disc 70, cylinders 71 and other structural members.

The wheel rim straightening device includes a wheel positioning system, a wheel jacking system, a wheel rotating system and a synchronous straightening system.

According to the wheel positioning system, the two guide rails 34 are fixed on the support table 32; the left sliding table 35 and the right sliding table 39 are symmetrically mounted on the guide rails 34; the left sliding table 35 and the right sliding table 39 are connected through the rack and pinions 38; the four positioning wheels 37 are symmetrically mounted on the left sliding table 35 and the right sliding table 39; the positioning air cylinder 33 is fixed on the side portion of the main machine frame 3; and the output end of the positioning air cylinder 33 is connected with the right sliding table 39. When the wheels reach the roller ways 36, the positioning air cylinder 33 is started to drive the right sliding table 39 to move, the left sliding table 35 moves synchronously under the action of the rack and pinions 38, and the wheel can be initially positioned by the four positioning wheels 37. After the wheels are positioned, the positioning wheels 37 are drawn back and reset.

According to the wheel jacking system, the lower air cylinders 4 and the lower guide columns 5 are fixed on the main machine frame 3; the output ends of the lower air cylinders 4 are connected with the lifting platform 7; and the lower guide sleeves 6 are mounted on the lifting platform 7; and the lower guide sleeves 6 are matched with the lower guide columns 5. The lower air cylinders 4 control the lifting platform 7 to move up and down under the guiding action of the lower guide columns 5. The first bearing seat 19 is fixed in the center of the lifting platform 7; the first shaft 20 is mounted on the first bearing seat 19; the round bush 23 is fixed on the first shaft 20; the first inner air cylinder 24 is fixedly mounted on the inner bottom surface of the round bush 23; the output end of the first inner air cylinder 24 is connected with the inner sliding block 26; the inner sliding block 26 is mounted on the inner guide rails 25; the inner guide rails 25 are mounted on the side wall of the round bush 23; and the first inner air cylinder 24 controls the inner sliding block 26 to move up and down under the guiding action of the inner guide rails 25. The second inner air cylinder 27 is fixed on the inner sliding block 26; the output end of the second inner air cylinder 27 is provided with the pull rod 28; the pull rod 28 is connected with the expanding core 29; and the expanding core 29 is matched with the expanding sleeve 31. The flange plate 30 is fixed to the inner sliding block 26. When the lower air cylinders 4 drive the lifting platform 7 to rise by a certain height, the flange plate 30 can approach the wheel flange surfaces, then precise adjustment is conducted, the first inner air cylinder 24 is started to drive the inner sliding block 26 to move upwards, thus, the flange plate 30 makes contact with the wheel flange surfaces, the wheels are axially positioned, then the second inner air cylinder 27 is started to drive the pull rod 28 to pull the expanding core 29, and the expanding sleeve 31 can expand center holes of the wheels, so that the wheels are radially positioned and locked. Then, the lower air cylinders 4 are started again to drive the lifting platform 7 to continue to rise by a certain height, and the clamped wheels can be jacked from the roller ways 36 to the air.

According to the wheel rotating system, the upper air cylinders 60 are fixed at the top of the main machine frame 3; the output ends of the upper air cylinders 60 are connected with the moving platform 63; the upper guide columns 62 are fixed on the moving platform 63; the upper guide columns 62 are matched with the upper guide sleeves 61; and the upper guide sleeves 61 are fixed at the top of the main machine frame 3. The upper air cylinders 60 can control the moving platform 63 to move up and down under the guiding action of the upper guide columns 62; the servo motor 65 is mounted on the moving platform 63 through the motor bracket 64; the rotating table 67 is mounted at the output end of the servo motor; the disc 70 is mounted on the rotating table 67; the cylinders 71 are mounted on the disc 70; and the cylinders 71 are used for being matched with wheel bolt holes. The number and position of the cylinders are consistent with the number of wheel bolt holes and the pitch circle diameter. When the wheels are jacked to the air, the upper air cylinders 60 are started to drive the moving platform 63 to move downwards, the cylinders 71 on the disc 70 can be inserted into the bolt holes from the front sides of the wheels, then the servo motor 65 is started to drive the rotating table 67 to rotate, torque can be transmitted to the wheels through the cylinders 71, and the wheels are rotated.

According to the synchronous straightening system, the left machine frame 1 and the right machine frame 2 are symmetrically arranged on the left side and the right side of the main machine frame 3; the left servo system is mounted on the left machine frame 1; and the right servo system is mounted on the right machine frame 2. The first horizontal servo motor 41 is fixed to the left machine frame 1; the output end of the first horizontal servo motor 41 is connected with the third ball screw 43, the first horizontal servo motor 41 controls the first horizontal sliding table 45 to move left and right under the guiding action of the first horizontal guide rail 44. The first vertical servo motor 40 is fixed on the first horizontal sliding table 45; the output end of the first horizontal sliding table 45 is connected with the fourth ball screw 47; and the first vertical servo motor 40 controls the first vertical sliding table 46 to move up and down under the guiding action of the first vertical guide rail 48. The outer pressure head 49 is mounted on the first vertical sliding table 46 through the bracket. The second horizontal servo motor 51 is fixed on the right machine frame 2; the output end of the second horizontal servo motor 51 is connected with the fifth ball screw 53; and the second horizontal servo motor 51 controls the second horizontal sliding table 55 to move left and right under the guiding action of the second horizontal guide rail 54. The second vertical servo motor 50 is fixed on the second horizontal sliding table 55; the output end of the second vertical servo motor 50 is connected with the sixth ball screw 57; and the second vertical servo motor 50 controls the second vertical sliding table 56 to move up and down under the guiding action of the second vertical guide rail 58. The second runout detecting gauge 59 is mounted on the second vertical sliding table 56 through a bracket. The inner servo systems are arranged on the lifting platform 7 in bilateral symmetry; the horizontal servo motors 17 are fixed on the support plates 8; the output ends of the horizontal servo motors 17 are connected with the first ball screws 12; and the horizontal servo motors 17 control the horizontal sliding tables 10 to move left and right under the guiding action of the horizontal guide rails 11. The vertical servo motors 9 are fixed on the horizontal sliding tables 10; the output ends of the vertical servo motors 9 are connected with the second ball screws 14; and the vertical servo motors 9 control the vertical sliding tables 18 to move up and down under the guiding action of the vertical guide rails 13. The inner pressure head 15 is mounted on the corresponding vertical sliding table 18 through a bracket. The right servo system on the lifting platform 7 is consistent with the left servo system; the first runout detecting gauge 22 is mounted on the vertical sliding table on the right side through a bracket. During straightening, the inner pressure head 15 and the outer pressure head 49 are at the same height, and are located inside and outside rims respectively, after the pressure heads make contact with the wheels, the pressure heads move synchronously and downwards for insertion and repair, and deformation of the inner rims and the outer rims are straightened; and the first runout detecting gauge 22 and the second runout detecting gauge 59 are at the same height as the pressure heads, follow the pressure heads to move synchronously and downwards along the rims for insertion and repair, and are used for monitoring the results of the inner rims and the outer rims after straightening, and straightening is repeated if straightening is unqualified.

A working process of a wheel rim straightening device is as follows: when the wheels reach the roller ways 36, the positioning air cylinder 33 is started to drive the right sliding table 39 to move, the left sliding table 35 moves synchronously under the action of the rack and pinions 38, the wheels are initially positioned by the four positioning wheels 37, and after the wheels are positioned, the positioning wheels 37 are drawn back and reset. Then, the lower air cylinders 4 are started to drive the lifting platform 7 to rise, the flange plate 30 is stopped near the wheel flange surfaces, then precise adjustment is conducted, the first inner air cylinder 24 is started to drive the inner sliding block 26 to move upward, the flange plate 30 makes contact with the wheel flange surfaces, the wheels are axially positioned, then the second inner air cylinder 27 is started to drive the pull rod 28 to pull the expanding core 29, and the expanding sleeve 31 expands center holes of the wheels, so that the wheels are radially positioned and locked. Then, the lower air cylinders 4 are started again to drive the lifting platform 7 to continue to rise by a certain height, and the clamped wheels are jacked from the roller ways 36 to the air. Then, the upper air cylinders 60 are started to drive the lifting platform 63 to move downwards, the cylinders 71 on the disc 70 can be inserted into the bolt holes from the front sides of the wheels, then the servo motor 65 is started to drive the rotating table 67 to rotate, and torque is transmitted to the wheels through the cylinders 71, so that the wheels are rotated. Finally, the servo straightening system is started, the inner pressure head 15 and the outer pressure head 49 are at the same height and are located inside and outside the rims respectively, and after the pressure heads make contact with the wheels, the pressure heads move synchronously and downwards for insertion and repair, and deformation of the inner rims and the outer rims are straightened; and the first runout detecting gauge 22 and the second runout detecting gauge 59 are at the same height as the pressure heads, follow the pressure heads to move synchronously and downwards along the rims for insertion and repair, and are used for monitoring the results of the inner rims and the outer rims after straightening, and straightening is repeated if straightening is unqualified.

Compared with the related art, the wheel rim straightening device of the disclosure has the following advantages:

Through cooperation of all the systems, the device can straighten wheel rims with runout errors and thin wall deformation, can be used for automatic continuous production, and is novel in structure, advanced in technology and high in practicability.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

The invention claimed is:

1. A wheel rim straightening device, comprising a main machine frame and a lifting platform, wherein
   a left machine frame and a right machine frame are symmetrically arranged on two sides of the main machine frame;
   a left servo system and a first horizontal sliding table are arranged on the left machine frame;
   the first horizontal sliding table is provided with a first vertical sliding table;
   the left servo system is configured for controlling the first horizontal sliding table to move left and right and controlling the first vertical sliding table to move up and down relative to the first horizontal sliding table;
   the right machine frame is provided with a right servo system and a second horizontal sliding table;
   a second vertical sliding table is arranged on the second horizontal sliding table;
   the right servo system is configured for controlling the second horizontal sliding table to move left and right and controlling the second vertical sliding table to move up and down relative to the second horizontal sliding table;
   the first vertical sliding table is provided with an outer pressure head which extends inwardly;
   the second vertical sliding table is provided with a second runout detecting gauge which extends inwardly;
   the lifting platform is symmetrically provided with left and right inner servo systems and left and right horizontal sliding tables;
   the left horizontal sliding table and the right horizontal sliding table are each provided with a vertical sliding table; and
   the two vertical sliding tables are provided with an inner pressure head which extends outwardly and corresponds to the outer pressure head, and a first runout detecting gauge corresponding to the second runout detecting gauge.

2. The wheel rim straightening device according to claim 1, wherein
   the left servo system comprises a first horizontal servo motor fixedly connected to the left machine frame, a first horizontal guide rail fixedly connected to the left machine frame, a first vertical servo motor fixedly connected to the first horizontal sliding table, and a first vertical guide rail fixedly connected to the first horizontal sliding table;
   an output end of the first horizontal servo motor is connected with a third ball screw; the first horizontal servo motor controls the first horizontal sliding table to move left and right under the guiding action of the first horizontal guide rail;
   an output end of the first vertical servo motor is connected with a fourth ball screw; and the first vertical servo motor controls the first vertical sliding table to move up and down under the guiding action of the first vertical guide rail.

3. The wheel rim straightening device according to claim 1, wherein
   the right servo system comprises a second horizontal servo motor fixedly connected to the right machine frame, a second horizontal guide rail fixedly connected to the right machine frame, a second vertical servo motor fixedly connected to the second horizontal sliding table, and a second vertical guide rail fixedly connected to the second horizontal sliding table;
   an output end of the second horizontal servo motor is connected with a fifth ball screw; the second horizontal servo motor controls the second horizontal sliding table to move left and right under the guiding action of the second horizontal guide rail;
   an output end of the second vertical servo motor is connected with a sixth ball screw; and the second vertical servo motor controls the second vertical sliding table to move up and down under the guiding action of the second vertical guide rail.

4. The wheel rim straightening device according to claim 1, wherein the outer pressure head is mounted on the first vertical sliding table through a bracket.

5. The wheel rim straightening device according to claim 1, wherein the second runout detecting gauge is mounted on the second vertical sliding table through a bracket.

6. The wheel rim straightening device according to claim 1, wherein
   each inner servo system comprises a support plate fixedly connected to the lifting platform, a horizontal servo motor fixedly connected to the support plate, and a horizontal guide rail fixedly connected to the support plate;
   output ends of the horizontal servo motors are connected with first ball screws;
   the horizontal servo motors control the horizontal sliding tables to move left and right under the guiding action of the horizontal guide rails;
   vertical servo motors and vertical guide rails are fixedly connected with the horizontal sliding tables;
   output ends of the vertical servo motors are connected with second ball screws; and the vertical servo motors control the vertical sliding tables to move up and down under the guiding action of the vertical guide rails.

7. The wheel rim straightening device according to claim 2, wherein each inner servo system comprises a support plate fixedly connected to the lifting platform, a horizontal servo motor fixedly connected to the support plate, and a horizontal guide rail fixedly connected to the support plate;

output ends of the horizontal servo motors are connected with first ball screws;

the horizontal servo motors control the horizontal sliding tables to move left and right under the guiding action of the horizontal guide rails;

vertical servo motors and vertical guide rails are fixedly connected with the horizontal sliding tables;

output ends of the vertical servo motors are connected with second ball screws; and the vertical servo motors control the vertical sliding tables to move up and down under the guiding action of the vertical guide rails.

8. The wheel rim straightening device according to claim 3, wherein each inner servo system comprises a support plate fixedly connected to the lifting platform, a horizontal servo motor fixedly connected to the support plate, and a horizontal guide rail fixedly connected to the support plate;

output ends of the horizontal servo motors are connected with first ball screws;

the horizontal servo motors control the horizontal sliding tables to move left and right under the guiding action of the horizontal guide rails;

vertical servo motors and vertical guide rails are fixedly connected with the horizontal sliding tables;

output ends of the vertical servo motors are connected with second ball screws; and the vertical servo motors control the vertical sliding tables to move up and down under the guiding action of the vertical guide rails.

9. The wheel rim straightening device according to claim 8, wherein the inner pressure head is mounted on the corresponding vertical sliding table through a bracket.

10. The wheel rim straightening device according to claim 8, wherein the first runout detecting gauge is mounted on the vertical sliding table on the right side through a bracket.

11. The wheel rim straightening device according to claim 1, wherein when wheel rims are subjected to straightening, the inner pressure head and the outer pressure head are at the same height and are located inside and outside the wheel rims respectively, and the first runout detecting gauge and the second runout detecting gauge are at the same height as the inner pressure head and the outer pressure head.

* * * * *